United States Patent
Gorun et al.

(10) Patent No.: US 9,150,431 B1
(45) Date of Patent: Oct. 6, 2015

(54) FLUOROPHTHALOCYANINE PHOTODYNAMIC WATER STERILIZATION

(71) Applicants: Sergiu M. Gorun, Montclair, NJ (US); Kimberly Ann Griswold, Flanders, NJ (US)

(72) Inventors: Sergiu M. Gorun, Montclair, NJ (US); Kimberly Ann Griswold, Flanders, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 490 days.

(21) Appl. No.: 13/688,816

(22) Filed: Nov. 29, 2012

Related U.S. Application Data

(60) Provisional application No. 61/567,762, filed on Dec. 7, 2011.

(51) Int. Cl.
*C02F 1/32* (2006.01)
*C02F 1/30* (2006.01)

(52) U.S. Cl.
CPC .... *C02F 1/30* (2013.01); *C02F 1/32* (2013.01)

(58) Field of Classification Search
CPC ...... C02F 1/78; C02F 1/4674; C02F 2303/04; C02F 1/36; C02F 1/325; B01J 19/123
USPC ............... 210/748.16, 748.01, 748.1, 748.11, 210/748.12, 748.13, 748.14, 749, 757, 153; 422/20, 22, 24, 186, 186.3; 250/432 R
See application file for complete search history.

(56) References Cited

U.S. PATENT DOCUMENTS

| 2004/0038956 A1* | 2/2004 | Nakada et al. ................ 514/191 |
| 2009/0159539 A1* | 6/2009 | Berkowitz et al. ............ 210/757 |

* cited by examiner

*Primary Examiner* — Walter D Griffin
*Assistant Examiner* — Cameron J Allen
(74) *Attorney, Agent, or Firm* — Henry S. Goldfine

(57) ABSTRACT

A method of purifying or sanitizing contaminated water to be potable, by exposing the water in the presence of light, to an electrically neutral metal complex of a perfluoroalkylated fluorinated phthalocyanine photosensitizer, having only external R groups with C—F bonds, preferably $F_{64}PcZn$; whereby, a sufficient quantity of singlet oxygen is provided by the chemical reaction of the light and the photosensitizer to destroy the pollutants or pathogens present in the contaminated water.

5 Claims, No Drawings

FLUOROPHTHALOCYANINE PHOTODYNAMIC WATER STERILIZATION

CROSS-REFERENCE TO RELATED APPLICATIONS

This application claims the benefit under 35 USC §119(e) of U.S. provisional patent application 61/567,762, filed on Dec. 7, 2011, which provisional is hereby incorporated by reference as if it were set-out herein in its totality.

FEDERAL RESEARCH STATEMENT

The invention described herein may be manufactured, used, and/or licensed by the U.S. Government for U.S. Government purposes.

FIELD OF THE INVENTION

The present invention relates to a method of water sterilization, specifically, exposing water to light in combination with particular phthalocyanine molecules with zinc and perfluoroalkyl substituent groups.

BACKGROUND OF THE INVENTION

Sewage effluent, industrial pollutants, surface runoff, animal waste and carcasses impact the potability of water worldwide. In many parts of the world, bacteria, protozoa, and/or parasites also impact the potability of water-particularly significant pathogens including: *Giardia lamblia*, a flagellated protozoan parasite, and *Cryptosporidium*, a genus of protozoan, which commonly cause diarrhea. To address such pollutants and pathogens, the sterilization of water is a critical need. Common methods such as filtering or boiling water may not be fully effective. Filtering can remove most bacteria and protozoa, but not viruses. Bacteria form spores that are resistant to boiling. Further, some strains of bacteria are resistant to heat above the boiling temperature of water.

Alternative chemical means of purification, such as the use, for example, of chlorine, chlorine dioxide, silver ion/chlorine dioxide, sodium hypochlorite (bleach), iodine, or ozone, can be hazardous—as such materials themselves are potentially hazardous to the user and the environment. Further, neither chlorine nor iodine alone is considered completely effective against *Cryptosporidium*, although they are partially effective against *Giardia*. Other known chemical means, such as the use of bromine ion exchange resins and granular calcium hypochlorite are generally not effective in killing highly resistant microorganisms.

Further, alternative means of water purification involve electrochemical sterilization, such as disclosed in U.S. Pat. Nos. 4,236,992, 4,308,117, 4,555,323, and 4,761,208, which means the use of electrodes and/or electrolytic cells. Electrochemical methods, as disclosed in these patents, require a power source, are relatively expensive while using and discharging materials which are potentially hazardous. The requirement of a power source is particularly restrictive.

Finally, an alternative nonchemical mean, such as the use of ultraviolet radiation is not effective in turbid water, and not very effective against viruses. Also, the use of relatively low intensity natural sun light UVA radiation can take significant time to produce the desired sterilization, and the use of relatively more intense artificial ultraviolet radiation can be potentially harmful to the user and also requires a power source and relatively significant cost.

As stated above, ozone ($O_3$, also known as trioxygen) is one of the alternative chemical means of purification, functioning as a powerful oxidant; however, $O_3$ is known to damage mucus and respiratory tissues in animals, and to damage plant tissues. Another form of oxygen is singlet oxygen (or $^1O_2$) which is less stable than triplet oxygen, the $O_2$ present in air, lasting only a about an hour at room temperature—depending on the local environment—so as not to be as environmentally damaging as ozone. Singlet oxygen is a very reactive oxidant, which is known as a means of killing cancer cells in photodynamic therapy. Also, work by P. Wentworth, Jr., et al, *Science* (2002) 298, 2195, indicates that singlet oxygen might form in aqueous biological environments dihydrogen trioxide (HOOOH), a powerful oxidant that antibodies might use to destroy bacteria. Interestingly, further, Maria C. DeRosa, et al, in an article titled: Photosensitized singlet oxygen and its applications, *Coordination Chemistry Reviews*, 233-234 (2002), pgs. 351-371, reported that significant work has been done on the use of photosensitized singlet oxygen in oxidation reactions for use in wastewater treatment. For example, with respect to use of photosensitized singlet oxygen for the conversion of sulfide to sulfate in aqueous solution—a reaction which is important in wastewater treatment—DeRosa reported on the use of Al(III), Zn(II), and Ga(III) complexes of anionic 2,9,16,23-tetrasulfophthaloxyanine, with the addition of oppositely, i.e. positively charged detergents to discourage aggregation; especially, Zn(II) phthalocyanine; Zn(II)-2,9,16,23-phthalocyanine tetracarboxylic acid; and/or sulfated phthalocyanine. DeRosa concluded that Zinc phthalocyanines showed oxygen consumption consistent with the complete conversion of sulfide to sulfate in aqueous solutions (and photosensitized singlet oxygen was thought to be responsible for the photooxidation). DeRosa opined that, once again, the use of detergents, such as cetyl trimethyl ammonium chloride (CTAC) strongly enhances the photoactivity of the sensitizers that have high aggregation tendencies—such as the subject phthalocyanines—and that detergents are required to avoid such aggregation that reduces reactivity. However, detergents such as CTAC are known to be very toxic to aquatic organisms, to be harmful if ingested, damaging to the eyes and irritating to the skin, and, to cause serious defects in developing embryos. Further, due to the C—H bonds and other functional groups of the photosensitizers disclosed by DeRosa et al, these materials are subject to self-destruction by the singlet oxygen that they produce.

There is clearly a need in the art for effective, quick, economically, and non-hazardous, environmentally friendly means to sterilize water and make it potable for human consumption; such as the use of photosensitized singlet oxygen—which are stable and not subject to destruction by singlet oxygen.

SUMMARY OF INVENTION

The present invention addresses the need for an effective, quick, economically, and non-hazardous, method to sterilize water and make it potable for human consumption, using a surprisingly simple photochemical means. Specifically, the invention is a method of exposing contaminated water to an electrically neutral metal complex of a perfluoroalkylated fluorinated phthalocyanine (Pc) photosensitizer, having only external R groups with C—F bonds, in the presence of sunlight, or a white or UV light—without the need for, or presence of, any detergents as required in the prior art. By so exposing the contaminated water to the Pc photosensitizer in the presence of light, a sufficient quantity of singlet oxygen is quickly produced by the chemical reaction of the light and the photosensitizer to destroy the pollutants or pathogens present in the contaminated water so as to make it potable for human consumption.

Preferably the electronically neutral perfluoroalkylated fluorinated phthalocyanine photosensitizer usefully in the present inventive method is $F_{16}PcZn$ and most preferably $F_{64}PcZn$. These particular perfluoroalkylated fluorinated phthalocyanine photosensitizers, by being electronically neutral will not agglomerate; and thereby, as stated above, avoid the need for the addition of any detergent as required in the prior art. Further, as the subject perfluoroalkylated fluorinated phthalocyanines are completely substituted at the eight peripheral positions with perfluoro isopropyl groups, there are no external C—H bonds to be attacked by the singlet oxygen; thereby, avoiding any destruction of the photosensitizer itself, and avoiding any potential build-up of debris—which debris would impact the effectiveness of the process. Finally, such electronically neutral perfluoroalkylated fluorinated phthalocyanines are themselves hydrophobic and insoluble, and therefore they themselves will not contaminate the water being cleaned.

More preferably, the electronically neutral perfluoroalkylated fluorinated phthalocyanine photosensitizers, useful in the inventive method, are first precipitated or otherwise incorporated onto the surface of a preferably clear substrate by known methods, thereby providing an embodiment which allows the penetration of sunlight, or a white or UV light; such that contaminated water can be passed over the substrate holding the electronically neutral perfluoroalkylated fluorinated phthalocyanine photosensitizer in the presence of such light. A most preferred embodiment would be depositing a strip of the inventive perfluoroalkylated fluorinated phthalocyanines photosensitizer along a length of the inside of clear tubing or piping, which tube or piping would allow the needed light to penetrate, and having the contaminated water flowing therethrough—such that the light impinging upon the perfluoroalkylated fluorinated phthalocyanine photosensitizer, creating singlet oxygen, which in-situ destroys the pollutants and pathogens within the contaminated water. A practical example of this process would be providing clear tubing, internally coated with a strip of $F_{16}PcZn$, or preferably $F_{64}PcZn$, from a water storage bladder to the mouth piece from the storage bladder—such that when the user drinks from the bladder the water stored in the bladder is transported through the clear tube, exposed to light in the presence of the $F_{16}PcZn$, or preferably $F_{64}PcZn$, and thereby exposed to singlet oxygen and made potable.

The nature of the subject invention will be more clearly understood by reference to the following detailed description and the appended claims.

DETAILED DESCRIPTION OF THE INVENTION

The inventive method for cleaning contaminated water involves exposing such water to an electrically neutral metal complex of perfluoroalkylated fluorinated phthalocyanines photosensitizer, having only external R groups containing C—F bonds; in the presence of sunlight, or a white or UV light; such that a sufficient quantity of singlet oxygen is generated to destroy most pollutants or pathogens present in the contaminated water. The preferred electronically neutral perfluoroalkylated fluorinated phthalocyanine photosensitizer is $F_{16}PcZn$, or more preferably $F_{64}PcZn$.

As detailed above, the required electronically neutral perfluoroalkylated fluorinated phthalocyanine photosensitizer may preferably be deposited upon the surface of a substrate by known, standard methods—such as conventional physical vapor deposition techniques, such as organic vapor phase deposition as detailed in U.S. Pat. No. 7,897,210 disclosing a method for organic vapor jet disposition (which patent is incorporated herein by reference); or spin coating; or atomic layer deposition (ALD); or polymer multilayer deposition (PML) technology—both evaporative and non-evaporative; or vacuum deposition, and the like. Wherein the substrate is preferable a clear tube or pipe within which the contaminated water is exposed to the perfluoroalkylated fluorinated phthalocyanine photosensitizer in the presence of sunlight, or UV light, or white light. Unlike unsubstituted phthalocyanines that are poorly soluble in organic solvents, and thus used as pigments, the subject perfluoroalkylated fluorinated phthalocyanines exhibit significant solubility in many organic solvent while being insoluble in water.

The production of the required electronically neutral perfluoroalkylated fluorinated phthalocyanine photosensitizer, include $F_{16}PcZn$ and $F_{64}PcZn$, is known and presented in *Dalton Trans.*, 2009, 1098-1100 (a publication of the Royal Society of Chemistry) in an article by S. M. Gorun et al., titled: Rational Design of a Reactive Yet Stable Organic-Based Photocatalyst. Within the Gorun et al article, note 14 details the synthesis of the subject electronically neutral perfluoroalkylated fluorinated phthalocyanines from commercially available reagents and commercially available organic solvents (which article is hereby incorporated herein by reference).

Importantly, the sanitizing, and biocidal effects if the singlet oxygen generated from the perfluoroalkylated fluorinated phthalocyanine photosensitizers with light and the contaminated water—are continuous—requiring no external energy source (other than the light). Further, the generation of the singlet oxygen and its oxidizing effects are limited to the interface between the water and the perfluoroalkylated fluorinated phthalocyanine photosensitizers—which perfluoroalkylated fluorinated phthalocyanine photosensitizers may be coated on, or otherwise mixed with a polymer to form a substrate—which substrate is not attacked by the singlet oxygen. And, as stated above, this coating may preferably be a linear strip along a length of a clear plastic tube or pipe (covering only a part of the interior circumference of the tube, so as to allow the light therethrough)—the tube or pipe itself will not be affected by the singlet oxygen.

Although the invention has been described above in relation to preferred embodiments thereof, it will be understood by those skilled in the art that variations and modifications can be effected in these preferred embodiments without departing from the scope and spirit of the invention.

We claim:
1. A method of sanitizing contaminated water comprising:
   (a) exposing the contaminated water to an electrically neutral metal complex of a perfluoroalkylated fluorinated phthalocyanine photosensitizer, having only external R groups with C—F bonds, in the presence of light;
   (c) whereby, a sufficient quantity of singlet oxygen is provided by the chemical reaction of the light and the photosensitizer to destroy the pollutants or pathogens present in the contaminated water;
   (c) thereby rendering the water potable.
2. The method of claim 1, wherein the light is selected from the group consisting of sunlight, or UV light, or white light.
3. The method of claim 1, wherein the electrically neutral metal complex of perfluoroalkylated fluorinated phthalocyanine is selected from the group consisting of $F_{64}PcZn$ and $F_{16}PcZn$.

4. The method of claim 1, wherein the electrically neutral metal complex of perfluoroalkylated fluorinated phthalocyanines is $F_{16}PcZn$.

5. The method of claim 1, wherein the perfluoroalkylated fluorinated phthalocyanine photosensitizer is $F_{16}PcZn$ and the $F_{16}PcZn$ is present as a thin strip coating along a length of a clear tube; through which tube the contaminated water is transported.

* * * * *